Patented June 29, 1954

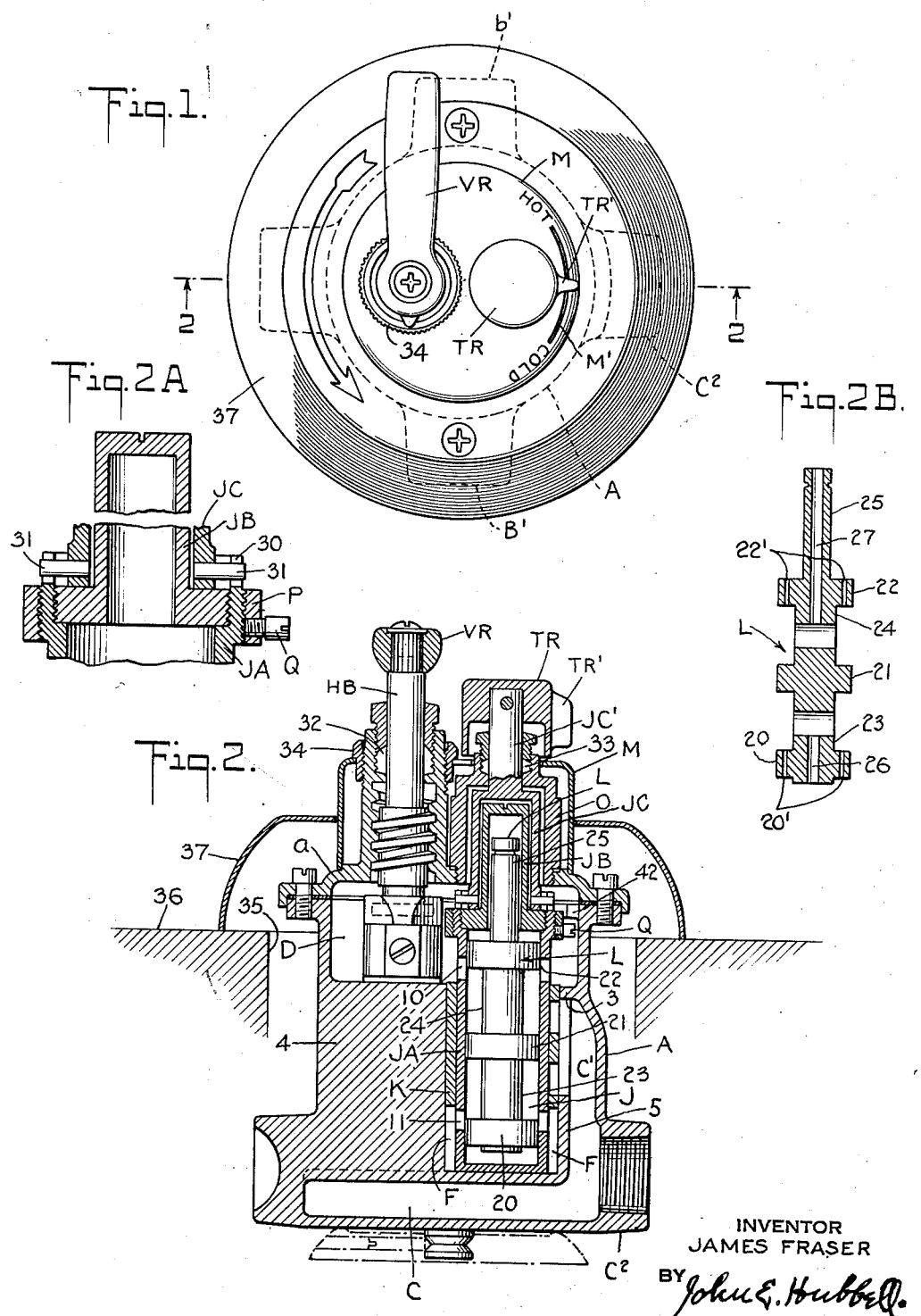

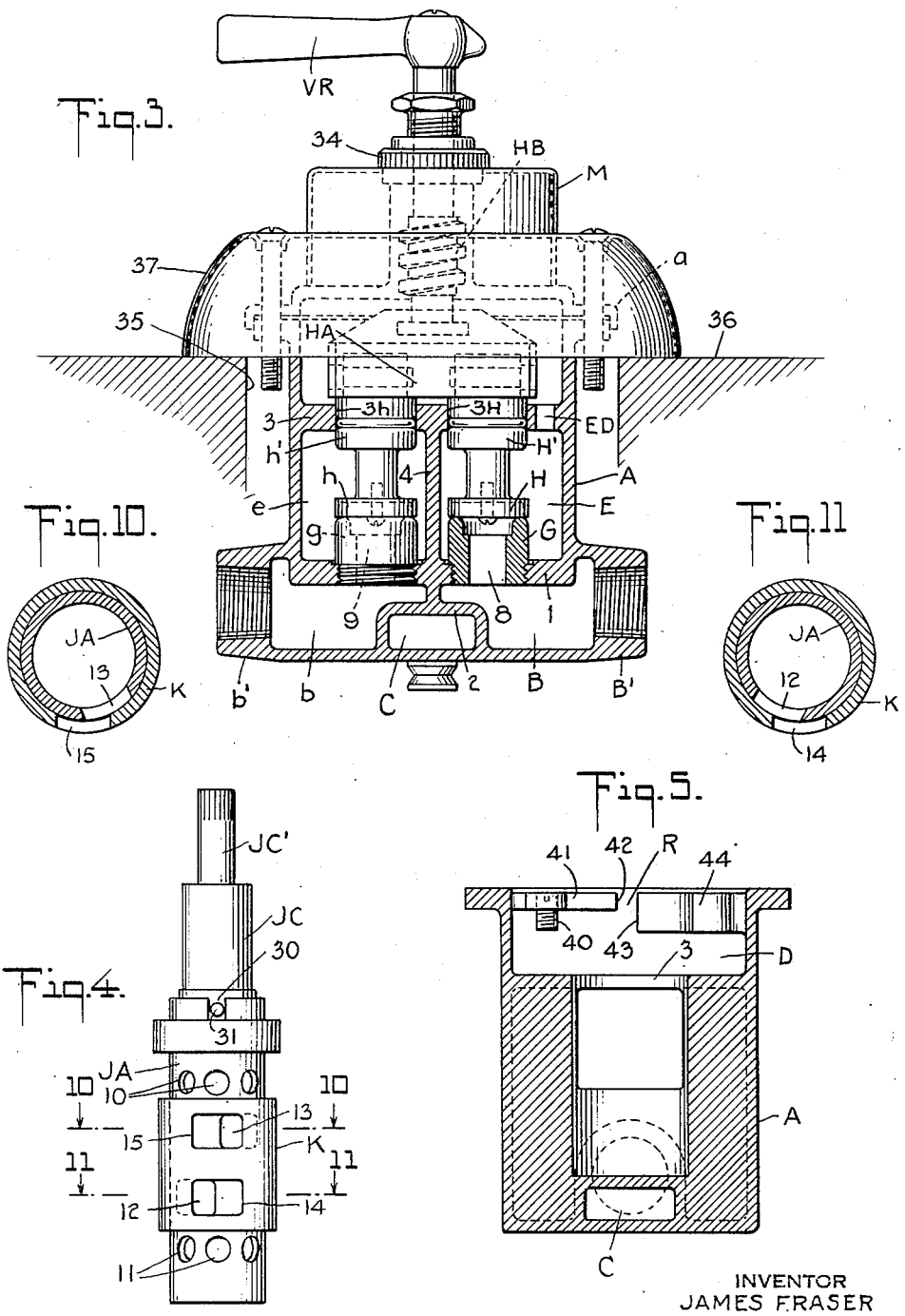

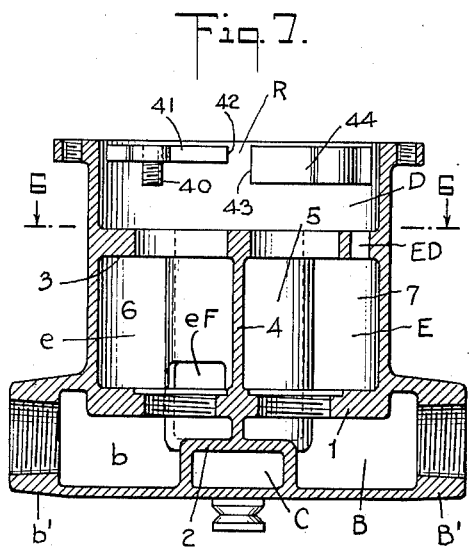
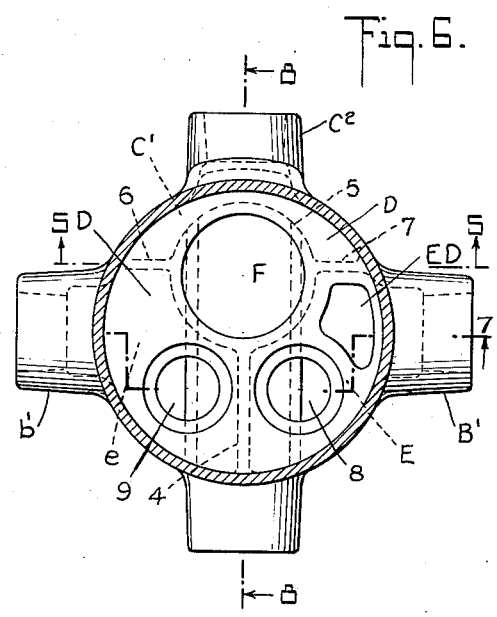
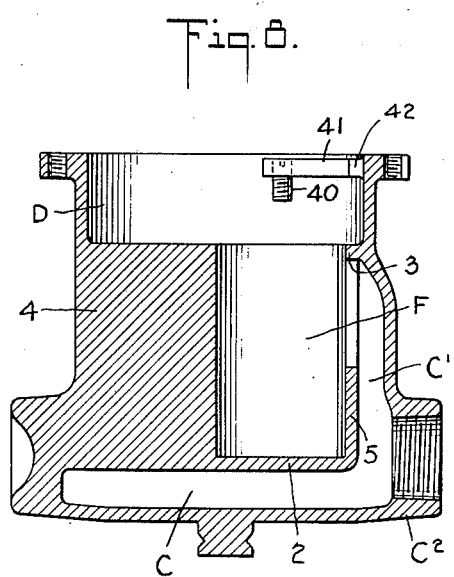
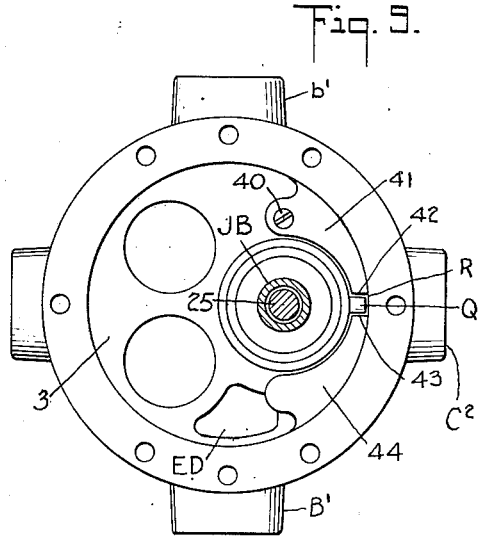

2,682,276

UNITED STATES PATENT OFFICE 2,682,276

MIXING VALVE WITH SEPARATE VOLUME AND MIXTURE REGULATORS

James Fraser, Wilmington, Del., assignor to Speakman Company, Wilmington, Del., a corporation of Delaware Application January 21, 1952, Serial No. 267,450

8 Claims. (Cl. 137—100)

The general object of the present invention is to provide an improved mixing valve of the known type adapted for use in mixing two fluids in regulable proportions and including pressure equalizing means comprising an element ordinarily in the form of a plunger or piston valve which operates in response to variations in the relative supply pressures of the two fluids to compensate for the tendency of such variations to vary the relative amounts of the two fluids included in the mixture formed. Mixing valves of the above mentioned type find their principal field of use in supplying shower heads with hot and cold water mixtures at temperatures normally dependent on valve adjustments made by the user. The inclusion in such a mixing valve of pressure equalizing mechanism responsive to variations in the relative hot and cold water supply pressures, greatly reduces the risk that the user will be scalded as a result of a sudden reduction in the pressure at which the cold water is supplied to the mixing valve.

Heretofore, it has been customary in mixing valves of the above mentioned type to control both the volume and the temperature of the hot and cold water mixture formed by the simultaneous adjustment of two valves, one of which operates on its adjustment to separately vary the resistances to flow through the separate cold water paths of flow to and away from the pressure equalizing mechanism, while the other valve operates on its adjustment to separately vary the resistances to flow through the separate hot water paths of flow to and away from the pressure equalizing mechanism.

The primary object of the present invention is to provide simple and effective means by which the resistances to flow through the hot and cold water paths of flow to or away from the pressure equalizing mechanism may be varied without varying the resistances to flow through the paths of flow respectively away from or to the pressure equalizing mechanism. In the preferred form of the present invention, I provide a valve mechanism including separate hot and cold water supply valves and means for simultaneously adjusting those valves to thereby close, open or variably throttle the separate paths through which cold and hot water pass to the pressure equalizing mechanism, and provide a second valve mechanism operable independently of the operation of said one valve mechanism to simultaneously but inversely vary the flow of hot and cold water away from the pressure equalizing mechanism.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a plan view of a mixing valve;

Fig. 2 is a section on the line 2—2 of Fig. 1;

Fig. 2A is an enlarged reproduction of a portion of Fig. 2;

Fig. 2B is a section through a pressure equalizing valve;

Fig. 3 is an elevation with its lower portion in section on the plane indicated by the broken line 7—7 of Fig. 6;

Fig. 4 is an elevation of parts shown in section in Fig. 2;

Fig. 5 is a valve body section taken on the line 5—5 of Fig. 6;

Fig. 6 is a section on the line 6—6 of Fig. 7;

Fig. 7 is a section on the broken line 7—7 of Fig. 6;

Fig. 8 is a section on line 8—8 of Fig. 6;

Fig. 9 is a plan view of the apparatus shown in Figs. 2 and 3 with the valve bonnet and parts mounted thereon removed; and Figs. 10 and 11 are sections on lines 10—10 and 11—11, respectively, of Fig. 4.

In the drawings, A designates the body portion, and $a$ the bonnet or "hub" portion of a mixing valve housing shown as generally cylindrical in form. The housing body A is formed with partition walls dividing its interior into chambers B, $b$, C, D, E, $e$ and F. The chambers B and $b$ are hot and cold water supply chambers respectively connected to inlets B' and $b'$. While the mixing valve embodiment of the invention shown in the drawings is customarily mounted with the axis of the valve body horizontal, the valve mechanism is operative when mounted in any position, and for convenience of description, the valve mechanism will be herein described as though it occupied the upright position shown in Fig. 2, with the chambers B and $b$ adjacent the lower end of the valve body A. The chamber D is adjacent the upper end of the body A, and between the latter and the bonnet $a$. Between the lower chambers B, $b$ and C and the upper chamber D are intermediate chambers E, $e$ and F.

As shown in Figs. 2 and 8, the chamber C comprises a horizontal portion beneath portions of the chambers B and b and an uprising portion alongside the chambers E, e and F.

The chambers B and b are cold and hot water chambers, respectively, having supply inlets B' and b', and the chamber C is a hot and cold water mixing chamber with a discharge outlet C². As is more fully explained hereinafter, the mixture regulating mechanism includes a pressure equalizing chamber J in a rotatable sleeve valve member JA. Hot water is passed to a hot water space in the lower portion of the chamber J from the chamber b through the chamber e, and cold water is separately passed to an upper portion of the chamber J through the chamber E and thence through the chamber D. The hot and cold water streams separately passed into the chamber J, pass separately from the latter into the outlet or mixing chamber C and thence away from the mixing valve through the outlet C² at a temperature regulated by the angular adjustment of a valve handle TR, and at a volumetric rate controlled by the angular adjustment of a valve handle VR.

The internal partitions in the valve body A include a transverse partition 1 separating the chambers B and b from the chambers E and e, a transverse partition 2 separating the lower portion of the chamber C from the chambers B and b and from the chamber F, a transverse partition 3 separating the chambers E and e from the chamber D, a partition 4 interposed between the chambers E and e, a cylindrical partition 5 separating the chamber F from the chambers E and e and separating a lower portion of the chamber F from the uprising portion of the mixing chamber C and partitions 6 and 7 respectively separating the chambers E and e from the uprising portion of the mixture chamber C. Annular valve seat members G and g surrounding ports 8 and 9, respectively, are mounted in apertures in the portion of the partition 2 respectively beneath the chambers E and e.

Flow through the port 8 from the chamber B into the chamber E is regulated by a poppet valve H, and a poppet valve h regulates flow between the chambers b and e through the port 9. The valves H and h are mechanically coupled for simultaneous movement downward toward the valve seats G and g to close the ports 8 and 9, and for simultaneous movement upward away from the valve seats to various distances therefrom, to thereby vary the aggregate flow through the ports 8 and 9. The valves H and h have upper end portions H' and h' extending through and snugly fitting in apertures 3H and 3h formed in the transverse partition wall 3' between the chambers E and e and the chamber F.

As shown, the valve members H and h are moved toward and away from the valve seat G and g respectively, by conventional operating means, shown best in Fig. 3, and comprising a cross head HA to which the upper ends of the valve members H and h are connected, and has an externally threaded portion received in an internally threaded passage through a top wall portion of the bonnet a. The previously mentioned volume regulating valve VR is secured to the upper end of the spindle HB and operates to rotate in the counterclockwise direction, as seen in Fig. 2, to move the valve members H and h away from the valve seats G and g and in the opposite direction to give the valve members opening adjustments. The angular adjustment of the valve handle VR regulates the volume of water passing through the mixing valve.

As previously stated, the mixture regulating mechanism includes a pressure equalizing chamber J in a rotatable sleeve valve member JA. As shown, the member JA extends through and fits snugly in a stationary, open-ended, sleeve valve member K. The latter, after being machined, is pressed into fixed permanent engagement with the wall 5 surrounding the chamber F. The member JA is in the form of an elongated cup with its closed lower end normally in engagement with the partition wall 2. The upper end of the chamber J is normally closed by an extension member JB in the form of an inverted cup with a peripheral flange at its lower end. The latter is externaly threaded and is screwed into the internally threaded upper end portion of the member JA.

The cylindrical wall of the member JA is formed with an upper circular series of cold water inlet ports 10, a lower circular series of hot water inlet ports 11, an upper hot water outlet port 12 and a lower cold water outlet port 13, the ports 12 and 13 being intermediate, and respectively adjacent the ports 10 and 11. The ports 10 open directly at their outer ends into the chamber D which receives cold water from the chamber E through a port ED in the transverse wall 3. The ports 11 receive hot water from the portion of the chamber F beneath the stationary sleeve valve K which is in communication with the chamber e through a port eF.

The cold and hot water simultaneously entering the chamber J through the ports 10 and 11 is prevented from mixing in that chamber by a pressure equalizing valve L, and passes out of the chamber J through the wall ports 12 and 13, respectively, in the member JA. The hot and cold water is mixed in the outlet chamber C when the angular adjustment of the sleeve valve member JA relative to the stationary sleeve valve K brings the ports 12 and 13 into suitable register with ports 14 and 15, respectively, extending through the wall of the member K. The disposition of the ports 12 and 13 relative to the ports 14 and 15 in one adjustment of the sleeve valve JA, is shown by Figs. 4, 10, and 11. The relative positions of the ports 12, 13, 14 and 15 shown in the last mentioned figures, is that required to make the mixing temperature an average of the hot and cold water temperatures. A clockwise angular adjustment of the valve sleeve JA relative to the valve sleeve K, from its position shown in Figs. 10 and 11, will lower the temperature of the hot and cold water mixture, where as a rotation of the valve member JA in the counterclockwise direction will increase the temperature of the mixture.

Mounted in the chamber J for axial movement therein, is a pressure equalizing valve L. The latter may well be, and as shown is, of the particular type and form disclosed and claimed in my prior Patent 2,443,499, granted June 15, 1948. The valve L comprises spaced apart lower, intermediate and upper piston valve sections 20, 21 and 22, which have their peripheral edges in snug sliding engagement with the inner wall of the member JA. The sections 20 and 21 are connected by a central stem or rod portion 23 of smaller diameter than the chamber J and unites with the chamber wall to form an annular hot water space of constant volume. Similarly, the valve sections 21 and 22 are connected by a central stem or rod portion 24 smaller in diameter than the chamber J, and uniting with the chamber wall to form an annular cold water space of constant volume. An uprising stem or rod-like extension 25 from the valve section 22 is provided in accordance with the invention of my prior patent to facilitate the ready removal of the valve L from the chamber J when necessary for inspection, cleaning, or other purposes.

The annular chamber space surrounding the portion 23 of the valve member L is in communication with the portion of the chamber beneath the valve section 20 through a passage 26, and the annular space surrounding the portion 24 of the valve L is connected by a passage 27 with the space within the chamber J above the piston valve section 22. In consequence, on an increase or decrease in the pressure of the cold water passing into the upper portion of the chamber J through the ports 10, relative to the pressure of the hot water passing into the lower portion of the chamber J through the ports 11, the valve member L is moved up or down respectively, as the result of the pressure acting downwardly against the portion of valve L above its section 21 relative to the pressure acting upwardly against the portion of the valve member L below said section. The resultant up or down movement of the valve L rebalances the pressures acting in opposite direction on the valve L by the movements of the valve sections 20 and 22 relative to the adjacent ports 11 and 10, respectively.

Each such axial movement of the valve member L respectively increases or decreases the free flow area through the cold water inlet ports 10, while simultaneously decreasing or increasing the free flow area through the hot water inlet ports 11. The cold water inlet ports 10 have a relatively small longitudinal extent as do the hot water inlet ports 11, and the vertical distance between the hot and cold water outlet ports 12 and 13 is appreciably greater than the thickness of the movable partition 21 between those ports. Thus, the movement of the valve member L in the chamber J, needed to maintain the pressures at opposite sides of the partition 21 in balance, is not great enough to cause the partition to throttle either of the outlet ports 12 and 13. Small diameter passages 20' and 22' through the sections 20 and 21 contribute to quiet operation.

The normal balancing movements of the valve member L have no significant effect on the total volume of water discharged so long as the hot and cold water supply pressures, are each high enough to permit the required balancing action to be made without materially reducing the flow of the water under the higher pressure.

As shown in Figs. 2 and 4, the upper end of the member JA is formed with diametrically opposed, radial slots 30 extending longitudinally into the member JA from its upper end. The slots 30 receive radial pins or projections 31 carried by the lower end of a member JB which forms an actuating extension of the member JA through which the latter is rotated to vary the net output flow areas of the associated ports 12 and 14 and the associated ports 13 and 15. The member JC is in the form of an inverted cup with an axial stem extension JC' at its upper end. The previously mentioned temperature control handle TR is secured to the upper end of the extension JC'. As shown, the handle TR is formed with a radial portion TR' extending over a stationary dial M' formed on the upper end of a cup-shaped casing element M detachably mounted on the bonnet member a and formed with openings through which pass the volume regulating spindle HB, the temperature regulating spindle JC', and stuffing boxes 32 and 33 for the spindles HB and JC', respectively. The stuffing box 32 for the spindle HB is formed in an integral portion of the bonnet a. The stuffing box 33 for the spindle JC' is formed in the upper end of a cup-shaped element O having its lower end externally threaded and screwed into an opening formed in the bonnet portion a of the housing. As shown, a nut 34 threaded on the outer wall of the stuffing box 32, holds the casing M in place against the bonnet a.

As shown in Fig. 2, the bulk of the mixing valve mechanism is received in an opening or recess 35 in a wall 36, and an escutcheon 37 in the form of an inverted cup with a central opening to receive the casing member M, serves as a cover for the opening 35 and the portion of the valve structure beneath the top of the escutcheon.

Advantageously and as shown, adjustable provisions are made for limiting the range of angular adjustment of the sleeve valve JA. Those provisions comprise a nut P screwed onto the external threaded inner end portion of the member JA. A pin Q having a threaded inner end is screwed into a radial threaded passage extending through the nut O into engagement with the member JA. The pin Q may thus be secured to the member JA in any desired angular position relative to the member JA.

The volume regulating adjustment range of the member J is limited to the arc of movement of the pin Q about the axis of the chamber F between vertical stops 40 and 43. As shown, the stop 40 is in the form of a pin depending from an internal, transverse flange, shelf or fin portion 41 of the valve body A adjacent the upper end of the latter. As shown, the stop pin 40 has a threaded upper end portion received in a threaded opening in the flange 41. One end 42 of the flange 41 faces the stop 43 and is separated from the latter by a space or passage R wide enough for the passage therethrough of the pin Q as the sleeve valve JA is moved up out of, and down into its normal position in the chamber F shown in Fig. 2. The stop 43 is the end surface of an internal fin or projection 44 from the upper end portion of the valve body A. As shown, the upper side of the projection 44 is flush with the upper side of the flange 41. The under side of the flange 41 is at a level slightly above the path of oscillation of the pin Q, while the shoulder 43 extends downward below said path.

In assembling the mixing valve, it is necessary to move the pin Q down through the slot R, and the pin Q thus serves as a useful location element to insure that in the assembled apparatus, the angular positions of the ports 12 and 13 are properly related to the positions of the parts 14 and 15 of the member K.

In the normal contemplated operation of the apparatus disclosed herein, the volume control handle VR is manually adjusted by the user to simultaneously raise and lower the valves H and h as required to open, close and variably throttle the flow of cold water through the port 8, and the flow of hot water through the port 9. Regardless of the extent to which the ports 8 and 9 are throttled, the relative rates at which hot and cold water pass from the chamber J into the mixing chamber C is wholly dependent on the positions of the ports 12 and 13 relative to the ports 14 and 15, respectively, so long as the pressures at which the hot and cold water pass through the inlet ports 10 and 11 are substantially equal, as they are under fully normal operating conditions. Under those conditions the operator can regulate the volume of the water discharged by adjustment of the volume control handle VR through the full volume range permitted by the maximum hot and cold water supply pressures. So long as cold and hot water are supplied to the respective inlet ports 10 and 11, the temperature of the mixture discharged is subject to regulation by the temperature regulator T. R. without regard to the adjustment position of the volume regulator VR.

In addition to the operating advantages obtained by independently regulating the volume and temperature of the water discharged, the embodiment of the present invention disclosed herein permits the attainment of other important advantages. Furthermore, all of those advantages are obtainable without any sacrifice of the special advantages obtained by the use of the desirable form of pressure balancing apparatus disclosed alike herein and in my previously mentioned prior Patent 2,443,499. Thus, one practically important characteristic of the invention is the comparative ease with which the valve L, the sleeve valve member JA, and associated parts are made accessible for inspection, cleaning or other purposes. With the volume regulator handle VR turned into the position in which the valves H and h close the ports 8 and 9, the removal of the readily removable casing member O from its threaded seat in the valve housing bonnet or "hub" portion a. With the valves H and h in engagement with the seats G and g, the removal of the member O and the parts made accessible for removal when the member O is removed, involve no water leakage possibility making it necessary to close a cut-off valve in the piping external to the mixing valve structure proper.

Furthermore, with the valves H and h in engagement with their seats G and g in the normal non-operative condition of the mixing valve, there is no water under pressure in any of the chambers in the mixing valve in position to produce leakage through stuffing boxes or through washers containing spaces or packing between the parts A and a, and between the parts a and O, with resultant annoying staining or discoloration of the tiles or bath tub walls or the like. It is to be noted also, that when water under pressure is being discharged through the mixing valve, all of the joints at the end of the mixing valve which is uppermost in Fig. 2, are in direct contact with cold water only. Furthermore, all of the wearing parts of the mixing valce are replaceable from the upper or front end of the mixing valve when the bonnet or "hub" part a is removed.

A further advantage of the present invention over mixing valves of the character shown in my above mentioned and other prior patents, is a reduction in the amount of valve-bearing surface in contact with stationary bearing walls. Thus the possibility that the valve members H and h will "freeze" or stick in the guide passages in the partition 3 through which said valve members extend, is practically completely eliminated. The reduction in bearing surface just mentioned is made possible by the fact that the valves H and h act only as volume controllers and not as both volume and temperature controllers, as do cold and hot water inlet valves of the character shown in my above mentioned prior patent. The stops 40 and 43 may and should be so located as to prevent the temperature regulator TR from being turned far enough in either direction to entirely cut off the discharge of water into the mixing chamber C. A practically desirable result of thus restricting the control action of the regulator TR is an avoidance of the intermittent discharge of water, very apt to occur when the user is permitted to move the regulator TR far enough in either direction to totally stop the discharge of water and then seeks to quickly restore the water discharge condition moving the regulator too far in the opposite direction.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Mixing valve apparatus comprising in combination, a pressure equalizing unit comprising a first valve member formed with a pressure balancing chamber and with cold and hot water inlet ports opening into cold and hot water portions of said chamber displaced from one another, and with cold and hot water outlet ports respectively in communication with said cold and hot water chamer portions, a second valve member in said chamber including a partition separating said cold and hot water chamber portions and including inlet port throttling portions and movable in response to differences between the water pressures in the chamber portions separated by said partition in the direction to rebalance said pressures by variably throttling said cold and hot water inlet ports, a third valve member having cold and hot water outlets normally in register, respectively, with portions of the first mentioned cold and hot water outlet ports, said first and third mentioned valve members being relatively adjustable and having their respective cold and hot water outlet ports so relatively positioned that the ratio of outflowing cold water to outflowing hot water through said ports will increase or decrease accordingly as the relative adjustment of said first and third valve members is in one direction or in the opposite direction, separate conduit means for passing cold and hot water under pressure to said cold and hot water inlet ports, and valve means adjustable to regulate flow through said conduit means, whereby the aggregate volume of cold and hot water discharged through said outlet ports may be regulated by adjustment of the last mentioned valve means, and the average temperature of the water discharged may be regulated by relative position adjustments of said first and third valve members.

2. Apparatus as specified in claim 1, in which said first valve member is a sleeve valve member, and in which the third valve member is a second sleeve valve member surrounding the first sleeve member, and in which said sleeve valves are relatively movable to vary the overlapping relation of the cold and hot water outlet ports of each sleeve valve member with the respective cold and hot water outlet ports of the other.

3. Apparatus as specified in claim 2, in which the third valve member is shorter than the first valve member, and surrounds a portion of the latter intermediate the cold and hot water inlet ports thereof.

4. Apparatus as specified in claim 2, in which the third valve member is stationary, and in which the first valve member is rotatable to vary the overlapping relation of the respective outlet ports of said sleeve members.

5. Apparatus as specified in claim 1, in which the cold and hot water outlet ports of said first valve member are so disposed, respectively, relative to the cold and hot water outlet ports of said third valve member, that in an intermediate relative position of said first and third valve members, the cold and hot water outlet ports of one of said valve members respectively overlap the cold and hot water outlet ports of the other valve member, and extend in opposite direction away from the cold and hot water ports which they respectively overlap.

6. A mixing valve having separate hot and cold water inlet chambers and a common outlet chamber, a pressure balancing and temperature regulating unit comprising a stationary outer sleeve valve member and an inner sleeve valve member mounted for angular adjustment in said stationary member and formed with a pressure balancing chamber and with cold and hot water inlet ports opening into longitudinally displaced portions of the last mentioned chamber from said cold and hot water inlet chambers, respectively, a pressure balancing valve member in said balancing chamber including a partition separating said chamber portions and including inlet port throttling portions and movable in response to differences between the water pressures at opposite sides of said partition in the direction to rebalance said pressures by variably throttling said cold and hot water inlet ports, said inner sleeve valve member having cold and hot water outlet ports in communication respectively with the hot and cold water portions of said chamber and said outer sleeve valve having cold and hot water outlet ports so positioned relative to the first mentioned cold and hot water outlet ports that the relative amounts of hot and cold water passing through said outlet ports may be increased or decreased by angular adjustment of said inner valve member relative to said outer sleeve valve.

7. A mixing valve as specified in claim 6, including a housing comprising a valve body open at one end and a bonnet detachably connected to said valve body and forming a closure for the upper end of the latter and cooperating with the valve body to form a chamber external to the valve body, said housing comprising partitions and passages enclosing said cold and hot water inlet chambers and separately connecting them to said cold and hot water inlet ports and an outlet chamber into which said outlet ports open, said stationary valve member being located within said valve body and said inner sleeve valve member, a detachable end portion extending into said space external to the valve body, said bonnet being formed with an aperture in register with said inner sleeve valve member through said end portion may be removed to permit access to and the removal of said pressure balancing valve member, a removable closure for said aperture, an operating shaft detachably connected to said inner sleeve valve and extending through and journalled in said removable closure for rotating said inner valve sleeve member, separate valve members mounted in said valve body for simultaneous adjustments to open, close and throttle the passages connecting said supply chamers to said inlet ports and actuating means for the last mentioned valves mounted in and extending through said bonnet.

8. A mixing valve as specified in claim 7, in which the said chamber external to said valve body forms a part of the passage connecting the cold water inlet chamber to the cold water inlet ports.

References Cited in the file of this patent

UNITED STATES PATENTS

| Number | Name | Date |
|---|---|---|
| 2,443,499 | Fraser | June 15, 1948 |
| 2,470,025 | Fraser | May 10, 1949 |